(12) United States Patent
Chen et al.

(10) Patent No.: US 11,821,346 B2
(45) Date of Patent: Nov. 21, 2023

(54) AUTOMOTIVE OIL-FILTER ASSEMBLY HAVING UNDER-MOUNTED RADIATOR AND MADE FROM ALUMINUM BY DIE CASTING

(71) Applicant: Zhejiang ROJ Auto parts Co., Ltd, Rui'an (CN)

(72) Inventors: Rong Wang Chen, Jianou (CN); Yong Bing Wu, Jianou (CN); Jin Tao Wu, Jianou (CN)

(73) Assignee: ZHEJIANG ROJ AUTO PARTS CO., LTD, Rui'an (CN)

( * ) Notice: Subject to any disclaimer, the term of this patent is extended or adjusted under 35 U.S.C. 154(b) by 0 days.

(21) Appl. No.: 17/844,077

(22) Filed: Jun. 20, 2022

(65) Prior Publication Data

US 2023/0287813 A1 Sep. 14, 2023

(30) Foreign Application Priority Data

Mar. 11, 2022 (CN) .......................... 202220540781.3

(51) Int. Cl.
| | | |
|---|---|---|
| *F01M 11/03* | (2006.01) | |
| *B60K 11/04* | (2006.01) | |
| *F01M 11/04* | (2006.01) | |
| *B01D 35/00* | (2006.01) | |
| *B01D 35/147* | (2006.01) | |
| *B01D 35/16* | (2006.01) | |
| *B01D 35/18* | (2006.01) | |

(52) U.S. Cl.
CPC ............ *F01M 11/03* (2013.01); *B01D 35/005* (2013.01); *B01D 35/147* (2013.01); *B01D 35/16* (2013.01); *B01D 35/185* (2013.01); *B60K 11/04* (2013.01); *F01M 11/04* (2013.01); *B01D 2201/34* (2013.01); *F01M 2011/031* (2013.01)

(58) Field of Classification Search
CPC .. F01M 11/03; F01M 11/04; F01M 2011/031; B01D 35/005; B01D 35/147; B01D 35/16; B01D 35/185; B01D 2201/34; B01D 35/30; B60K 11/04
See application file for complete search history.

(56) References Cited

U.S. PATENT DOCUMENTS

| | | | | |
|---|---|---|---|---|
| 2008/0006229 A1* | 1/2008 | Wilmink | ................... | F01P 7/16 123/196 AB |
| 2016/0136548 A1* | 5/2016 | Byun | ..................... | B01D 35/30 210/435 |

FOREIGN PATENT DOCUMENTS

| | | | | |
|---|---|---|---|---|
| CN | 215719024 U | | 2/2022 | |
| DE | 4400952 C1 * | | 5/1995 | ............. F01M 11/00 |
| EP | 2578821 A1 * | | 4/2013 | ........... B01D 35/005 |

* cited by examiner

*Primary Examiner* — Syed O Hasan
(74) *Attorney, Agent, or Firm* — Bayramoglu Law Offices LLC

(57) ABSTRACT

An automotive oil-filter assembly includes a main body made from aluminum by high-pressure die casting, where a filter element mounting base and a radiator mounting position are arranged on the main body; a filter element is inserted into the filter element mounting base, and a radiator is mounted at the radiator mounting position; a main body cap is mounted on the filter element mounting base; a bypass valve is arranged at an end, adjacent to the main body cap, of the filter element and communicates with the filter element; an oil inlet of the main body is located at one end of the main body and communicates with the filter element mounting base; and an oil inlet of the radiator, an oil outlet of the radiator, a coolant inlet of the radiator, and a coolant outlet of the radiator are located at the radiator mounting position.

6 Claims, 2 Drawing Sheets

AUTOMOTIVE OIL-FILTER ASSEMBLY HAVING UNDER-MOUNTED RADIATOR AND MADE FROM ALUMINUM BY DIE CASTING

CROSS REFERENCE TO THE RELATED APPLICATIONS

This application is based upon and claims priority to Chinese Patent Application No. 202220540781.3, filed on Mar. 11, 2022, the entire contents of which are incorporated herein by reference.

TECHNICAL FIELD

The present invention relates to the field of oil filters, and in particular to an automotive oil-filter assembly having an under-mounted radiator and made from aluminum by die casting.

BACKGROUND

In general, oil filters are arranged at the bottoms of engines of oil-fueled automobiles to filter dust, metal particles, carbon deposits, soot particles, or other impurities contained in oil, so that the engines can be protected.

The main bodies of the existing oil-filter assemblies are typically made from plastics by injection molding, and the plastics lead to low structural strength in most cases. In view of this, it is necessary to mount multiple reinforcing ribs onto the surfaces of the main bodies and mount metal inserts into fixing holes, such that the main bodies are fixedly connected to fasteners through the metal inserts. Furthermore, plastics have poor heat resistance, and the engines inevitably generate high temperatures during operation. As a result, the oil-filter assemblies made from plastics are likely to be deformed and aged after being heated. Consequentially, the sealing performance of the oil-filter assemblies is affected, and the service life of the oil-filter assemblies is shortened.

At present, oil-filter assemblies made from aluminum by pouring have been developed. For instance, present invention Patent No. CN215719024U discloses an automotive oil-filter assembly, including a main body (1) made from aluminum by pouring, where an oil inlet hole (2), an oil outlet hole (3) of an engine, a first oil return hole (4) of the engine, a second oil return hole (5) of the engine, and a fixing hole (6) of the engine are formed in the main body; the main body passes through the fixing hole (6) of the engine to be fixed to the engine by a fastener; the lower portion of the main body is provided with a filter element mounting base (7), an oil inlet hole (8) of a radiator, a first oil outlet hole (9) of the radiator, a second oil outlet hole (10) of the radiator, and a fixing hole (11) of the radiator; and the radiator is arranged at the lower portion of the main body and is fixed in the fixing hole (11) of the radiator by a fastener.

The oil inlet hole (8) of the radiator has an upper end communicating with the oil outlet hole (3) of the engine and a lower end communicating with an inlet of the radiator, and an outlet of the radiator communicates with the first oil outlet hole (9) of the radiator and the second oil outlet hole (10) of the radiator. The first oil outlet hole (9) of the radiator communicates with the filter element mounting base (7), and a filter element is arranged in the filter element mounting base. The filter element mounting base communicates with the first oil return hole (4) of the engine, and the second outlet hole (10) of the radiator communicates with the second oil return hole (5) of the engine. However, as can be seen from the operating principle described in the specification, when the engine operates, the oil in the engine enters the main body via the oil outlet hole of the engine and then enters the radiator via the oil inlet hole of the radiator at the lower portion of the main body to be cooled by the radiator; the cooled oil flows back into the main body via the first oil outlet hole of the radiator and the second oil outlet hole of the radiator; and the first oil outlet hole of the radiator communicates with the filter element mounting base. Part of the oil enters the filter element mounting base to be filtered by the filter element in the filter element mounting base for elimination of the impurities, and then flows back into the engine via the first oil return hole of the engine; and while the oil flowing to the second oil outlet hole of the radiator directly flows back into the engine via the second oil return hole of the engine. From the above, due to the improper structure, only part of the oil can be filtered from beginning to end, and the other part of the oil directly flows back into the engine, resulting in poor filtering effects. Moreover, fuel oil is cooled only by means of the radiator, resulting in poor cooling effects. Thus, an improvement is urgently needed.

SUMMARY

The objective of the present invention is to overcome the shortcomings of the prior art by providing an automotive oil-filter assembly having an under-mounted radiator and made from aluminum by die casting.

The present invention achieves the above objective through the following technical solutions: an automotive oil-filter assembly having an under-mounted radiator and made from aluminum by die casting includes a main body made from aluminum by high-pressure die casting, where a filter element mounting base for mounting a filter element and a radiator mounting position for mounting a radiator are arranged on the main body; the filter element is inserted into the filter element mounting base, and the radiator is mounted at the radiator mounting position; a main body cap configured to limit the filter element in the filter element mounting base is mounted on the filter element mounting base; a bypass valve is arranged at an end, adjacent to the main body cap, of the filter element and communicates with the filter element; an oil inlet of the main body is located at one end of the main body and communicates with the filter element mounting base; an oil inlet of the radiator, an oil outlet of the radiator, a coolant inlet of the radiator, and a coolant outlet of the radiator are located at the radiator mounting position; the oil inlet of the radiator communicates with the oil outlet of the radiator; a coolant inlet of the main body and at least one coolant outlet of the main body are formed in the main body; the coolant inlet of the main body communicates with the coolant inlet of the radiator, and the coolant outlet of the radiator communicates with the coolant outlet of the main body; a temperature sensor connecting hole and a pressure sensor connecting hole are formed in the main body; and a temperature sensor is mounted in the temperature sensor connecting hole, and a pressure sensor is mounted in the pressure sensor connecting hole.

From the above technical solution, the operating principle of the present invention is as follows: oil in the engine enters the filter element mounting base via the oil inlet of the main body to be filtered by the filter element in the filter element mounting base, and the filtered oil flows to the oil inlet of the radiator via an oil outlet of the filter element mounting base; a large part of the oil enters the radiator at the radiator mounting position via the oil inlet of the radiator to be cooled, and the cooled oil flows to the oil outlet of the radiator; a small part of the oil flows to the oil outlet of the radiator via a passage in the main body; a large part of the oil flowing to the oil outlet of the radiator enters the engine via the oil outlet of the main body, and a small part of the oil flowing to the oil outlet of the radiator flows to the temperature sensor in the temperature sensor connecting hole and the pressure sensor in the pressure sensor connecting hole to fulfill monitoring on the temperature and pressure of the oil entering and exiting from the main body; passages respectively communicating with the temperature sensor connecting hole and the pressure sensor connecting hole are formed in the main body and also communicate with the oil outlet of the radiator; a coolant in a cooling system of the engine enters the main body via the coolant inlet of the main body, then flows to the coolant inlet of the radiator and enters the radiator, and afterwards flows out of the radiator via the coolant outlet of the radiator; and the coolant flowing to the coolant outlet of the radiator flows back into the cooling system of the engine via the two coolant outlets of the main body, which communicate with the coolant outlet of the radiator. When the filter element is blocked, the oil entering the main body via the oil inlet of the main body is pressurized; and at this time, the bypass valve on the filter element needs to be opened. In this way, the oil flows to the oil inlet of the radiator from the oil outlet of the filter element mounting base via the bypass valve and a cavity of the filter element, so that pressure relief is achieved. According to the present invention, all the oil entering the main body of the oil-filter assembly is filtered by the filter element in the filter element mounting base first, so that a better filtering effect is achieved; the coolant in the cooling system of the engine is introduced into the oil-filter assembly to cool the oil flowing through the radiator, so that an more excellent cooling effect is achieved; and the main body is made from the aluminum by the die casting, so that higher overall strength and more remarkable heat resistance are achieved, the main body is not prone to deformation, and the product formed by the die casting is more attractive in appearance.

Further, an oil drain inlet of the main body is formed in the filter element mounting base, and an oil drain outlet of the main body is formed in the main body and communicates with the oil drain inlet of the main body.

From the above technical solution, when the filter element or the oil needs to be replaced, the main body cap is opened first, and then the filter element in the filter element mounting base is taken out. At this moment, the oil remaining in the main body flows to the oil drain outlet of the main body from the oil drain inlet of the main body, which communicates with the oil drain outlet of the main body, and then enters the engine. In this way, the oil cannot splash or remain in the main body during replacement of the filter element or the oil, so that the oil can be replaced more thoroughly.

Further, the main body is provided with a first plug opening, a second plug opening and a third plug opening which are configured to mount plug screws; and a first plug is mounted in the first plug opening through a first plug seal, a second plug is mounted in the second plug opening through a second plug seal, and a third plug is mounted in the third plug opening through a third plug seal.

From the above technical solution, an inner passage needs to be formed when the main body is machined to form the oil drain inlet of the main body and the oil drain outlet of the main body; and after this inner passage is formed, a first process hole, namely the first plug opening, is formed in the main body. An inner passage needs to be formed when the main body is machined to form the coolant outlet of the main body; and after this inner passage is formed, a second process hole, namely the second plug opening, is formed in the main body. An inner passage needs to be formed when the oil inlet of the radiator and the oil outlet of the radiator are formed; and after this inner passage is formed, a third process hole, namely the third plug opening, is formed in the main body. The three process holes all need to be sealed with the plug screws and the seals to guarantee the sealing performance, while the aluminum main body can be directly sealed with the plug screws and the seals; and the traditional plastic plugs are welded by means of a welding process.

Further, a plurality of fixing mounting holes of the radiator are formed at a periphery of the radiator mounting position, and a plurality of fixing mounting holes of the main body are formed at a periphery of the main body.

From the above technical solution, the fixing mounting holes of the radiator are configured to mount the radiator, and the fixing mounting holes of the main body are configured to mount the main body onto the engine. The radiator is fixed via the fixing mounting holes of the radiator by means of first fasteners, and the main body is fixed to the engine via the fixing mounting holes of the main body by means of second fasteners. The product is made from the aluminum by the die casting, so that higher accuracy is achieved. The fixing mounting holes of the radiator and the fixing mounting holes of the main body can achieve a reliable fixing effect without metal seals by virtue of their positions.

Further, a radiator seal is arranged at each of the oil inlet of the radiator, the oil outlet of the radiator, the coolant inlet of the radiator, and the coolant outlet of the radiator.

From the above technical solution, the a radiator seal is arranged at each of the oil inlet of the radiator, the oil outlet of the radiator, the coolant inlet of the radiator, and the coolant outlet of the radiator; and in this way, oil leakage at the oil inlet of the radiator and the oil outlet of the radiator and coolant leakage at the coolant inlet of the radiator and the coolant outlet of the radiator are avoided, so that mixing of the coolant and the oil is prevented.

The present invention has the following beneficial effects: the better filtering effect of the oil-filter assembly is achieved; the coolant in the cooling system of the engine is introduced into the oil-filter assembly to cool the oil flowing through the radiator, so that the more excellent cooling effect is achieved; and the main body is made from the aluminum by the die casting, so that the higher overall strength and more remarkable heat resistance are achieved, the main body is not prone to deformation, and the product formed by the die casting is more attractive in appearance.

The following describes the present invention in detail with reference to the accompanying drawings and embodiments.

DETAILED DESCRIPTION OF THE EMBODIMENTS

Figure 1:
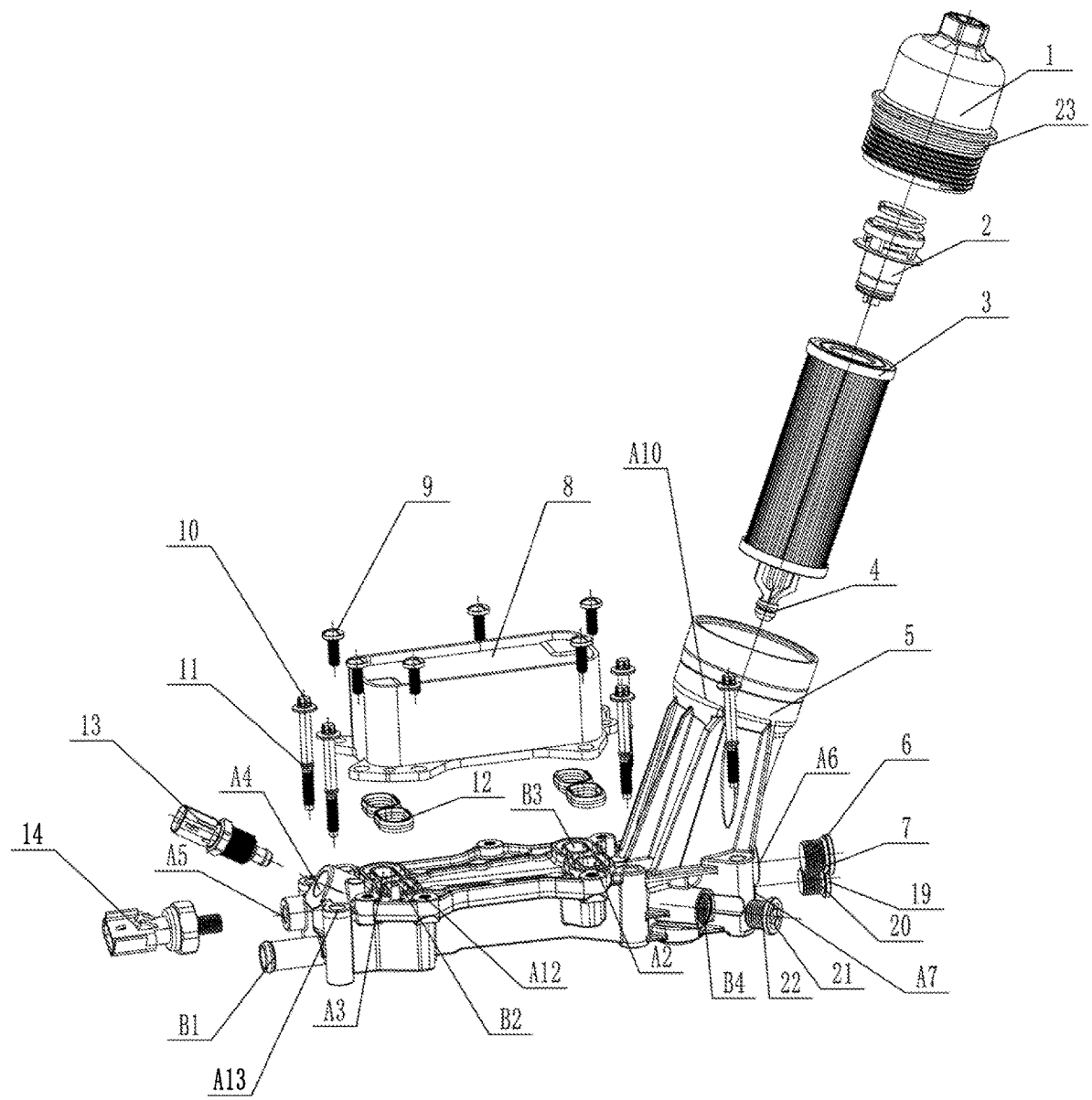
FIG. 1 is an exploded view of an automotive oil-filter assembly having an under-mounted radiator and made from aluminum by die casting in an embodiment of the present invention.
Figure 2:
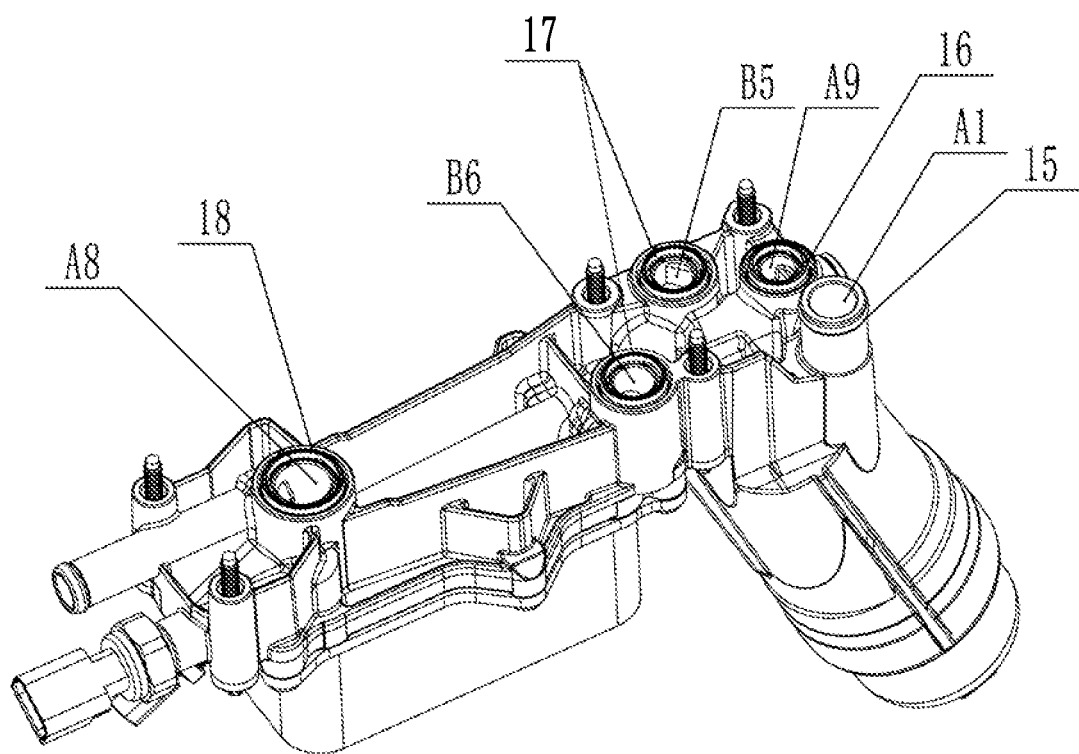
FIG. 2 is a structural diagram of a main body of the automotive oil-filter assembly having an under-mounted radiator and made from aluminum by die casting in the embodiment of the present invention.

Referring to FIG. 1 and FIG. 2, an automotive oil-filter assembly having an under-mounted radiator and made from aluminum by die casting includes a main body 5 made from aluminum by high-pressure die casting, where a filter element mounting base A10 for mounting a filter element and a radiator mounting position for mounting a radiator 8 are arranged on the main body 5; and the filter element 3 is inserted into the filter element mounting base A10, and the radiator 8 is mounted at the radiator mounting position. A main body cap 1 configured to limit the filter element 3 in the filter element mounting base A10 is mounted on the filter element mounting base A10, and a bypass valve 2 is arranged at an end, adjacent to the main body cap 1, of the filter element 3 and communicates with the filter element 3. An oil inlet A1 of the main body 5 is located at one end of the main body 5 and communicates with the filter element mounting base A10; an oil inlet A2 of the radiator 8, an oil outlet A3 of the radiator 8, a coolant inlet B2 of the radiator 8, and a coolant outlet B3 of the radiator 8 are located at the radiator mounting position; the oil inlet A2 of the radiator 8 communicates with the oil outlet A3 of the radiator 8, and the coolant inlet B2 of the radiator 8 communicates with the coolant outlet B3 of the radiator 8 through the radiator 8; a coolant inlet B1 of the main body 5, a first coolant outlet B5 of the main body 5, and a second coolant outlet B6 of the main body 5 are formed in the main body 5; and the coolant inlet B1 of the main body 5 communicates with the coolant inlet B2 of the radiator 8, and the coolant outlet B3 of the radiator 8 communicates with the first coolant outlet B5 of the main body 5 and the second coolant outlet B6 of the main body 5. A temperature sensor connecting hole A4 and a pressure sensor connecting hole A5 are formed in the main body 5; and a temperature sensor 13 is mounted in the temperature sensor connecting hole A4, and a pressure sensor 14 is mounted in the pressure sensor connecting hole A5.

An oil drain inlet of the main body 5 is formed in the filter element mounting base A10, and an oil drain outlet A9 of the main body 5 is formed in the main body 5 and communicates with the oil drain inlet of the main body 5.

The main body 5 is provided with a first plug opening A7, a second plug opening B4, and a third plug opening A6 which are configured to mount plug screws; and a first plug 19 is mounted in the first plug opening A7 through a first plug seal 20, a second plug 21 is mounted in the second plug opening B4 through a second plug seal 22, and a third plug 6 is mounted in the third plug opening A6 through a third plug seal 7.

A plurality of fixing mounting holes A12 of the radiator 8 are formed at a periphery of the radiator mounting position, and a plurality of fixing mounting holes A13 of the main body 5 are formed at a periphery of the main body 5.

A radiator seal 12 is arranged at each of the oil inlet A2 of the radiator 8, the oil outlet A3 of the radiator 8, the coolant inlet B2 of the radiator 8, and the coolant outlet B3 of the radiator 8.

To guarantee sealing performance, a seal 15 is arranged at the oil inlet A1 of the main body 5 to avoid oil leakage probably occurred during a connection between an engine and the oil inlet A1 of the main body 5, a seal 16 is arranged at the oil drain outlet A9 of the main body 5 to avoid oil leakage probably occurred during a connection between the engine and the oil drain outlet A9 of the main body 5, and a seal 18 is arranged at an oil outlet A8 of the main body 5 to avoid possible oil leakage during connection between the engine and the oil outlet A8 of the main body 5; a seal 17 is arranged at each of the first coolant outlet B5 of the main body 5 and the second coolant outlet B6 of the main body 5; and a seal 11 is arranged at each fixing bolt 10 of the main body 5 to avoid oil leakage probably occurred when the main body 5 is mounted on the engine. The operating principle of the present invention is as follows: oil in the engine enters the filter element mounting base via the oil inlet of the main body to be filtered by the filter element in the filter element mounting base, and the filtered oil flows to the oil inlet of the radiator via an oil outlet of the filter element mounting base; a large part of the oil enters the radiator at the radiator mounting position via the oil inlet of the radiator to be cooled, and the cooled oil flows to the oil outlet of the radiator; a small part of the oil flows to the oil outlet of the radiator via a passage in the main body; a large part of the oil flowing to the oil outlet of the radiator enters the engine via the oil outlet of the main body, and a small part of the oil flowing to the oil outlet of the radiator flows to the temperature sensor in the temperature sensor connecting hole and the pressure sensor in the pressure sensor connecting hole to fulfill monitoring on the temperature and pressure of the oil entering and exiting from the main body; passages respectively communicating with the temperature sensor connecting hole and the pressure sensor connecting hole are formed in the main body and also communicate with the oil outlet of the radiator; a coolant in a cooling system of the engine enters the main body via the coolant inlet of the main body, then flows to the coolant inlet of the radiator and enters the radiator, and afterwards flows out of the radiator via the coolant outlet of the radiator; and the coolant flowing to the coolant outlet of the radiator flows back into the cooling system of the engine via the two coolant outlets of the main body, which communicate with the coolant outlet of the radiator. When the filter element is blocked, the oil entering the main body via the oil inlet of the main body is pressurized; and at this time, the bypass valve on the filter element needs to be opened. In this way, the oil flows to the oil inlet of the radiator from the oil outlet of the filter element mounting base via the bypass valve and a cavity of the filter element, so that pressure relief is achieved. All the oil entering the main body of the oil-filter assembly is filtered by the filter element in the filter element mounting base first, so that a better filtering effect is achieved; the coolant in the cooling system of the engine is introduced into the oil-filter assembly to cool the oil flowing through the radiator, so that an more excellent cooling effect is achieved; and the main body is made from the aluminum by the die casting, so that higher overall strength and more remarkable heat resistance are achieved, the main body is not prone to deformation, and the product formed by the die casting is more attractive in appearance. When the filter element or the oil needs to be replaced, the main body cap is opened first, and then the filter element in the filter element mounting base is taken out. At this moment, the oil remaining in the main body flows to the oil drain outlet of the main body from the oil drain inlet of the main body, which communicates with the oil drain outlet of the main body, and then enters the engine. In this way, the oil cannot splash or remain in the main body during replacement of the filter element or the oil, so that the oil can be replaced more thoroughly. An inner passage needs to be formed when the main body is machined to form the oil drain inlet of the main body and the oil drain outlet of the main body; and after this inner passage is formed, a first process hole, namely the first plug opening, is formed in the main body. An inner passage needs to be formed when the main body is machined to form the coolant outlet of the main body; and after this inner passage is formed, a second process hole, namely the second plug opening, is formed in the main body. An inner passage needs to be formed when the oil inlet of the radiator and the oil outlet of the radiator are formed; and after this inner passage is formed, a third process hole, namely the third plug opening, is formed in the main body. The three process holes all need to be sealed with the plug screws and the seals to guarantee the sealing performance, while the aluminum main body can be directly sealed with the plug screws and the seals; and the traditional plastic plugs are welded by means of a welding process. The fixing mounting holes of the radiator are configured to mount the radiator, and the fixing mounting holes of the main body are configured to mount the main body onto the engine. The radiator is fixed via the fixing mounting holes of the radiator by means of first fasteners, and the main body is fixed to the engine via the fixing mounting holes of the main body by means of second fasteners. The product is made from the aluminum by the die casting, so that higher accuracy is achieved. The fixing mounting holes of the radiator and the fixing mounting holes of the main body can achieve a reliable fixing effect without metal seals by virtue of their positions. The radiator seal is arranged at each of the oil inlet of the radiator, the oil outlet of the radiator, the coolant inlet of the radiator, and the coolant outlet of the radiator; and in this way, oil leakage at the oil inlet of the radiator and the oil outlet of the radiator as well as coolant leakage at the coolant inlet of the radiator and the coolant outlet of the radiator are avoided, so that mixing of the coolant and the oil is prevented.

What is claimed is:

1. An automotive oil-filter assembly having an under-mounted radiator and made from aluminum by die casting, comprising a main body made from aluminum by high-pressure die casting, wherein a filter element mounting base for mounting a filter element and a radiator mounting position for mounting a radiator are arranged on the main body; the filter element is inserted into the filter element mounting base, and the radiator is mounted at the radiator mounting position; a main body cap configured to limit the filter element in the filter element mounting base is mounted on the filter element mounting base; a bypass valve is arranged at an end of the filter element and communicates with the filter element, wherein the end of the filter element is adjacent to the main body cap; an oil inlet of the main body is located at an end of the main body and communicates with the filter element mounting base; an oil inlet of the radiator, an oil outlet of the radiator, a coolant inlet of the radiator, and a coolant outlet of the radiator are located at the radiator mounting position; the oil inlet of the radiator communicates with the oil outlet of the radiator; a coolant inlet of the main body and at least one coolant outlet of the main body are formed in the main body; the coolant inlet of the main body communicates with the coolant inlet of the radiator, and the coolant outlet of the radiator communicates with the at least one coolant outlet of the main body; a temperature sensor connecting hole and a pressure sensor connecting hole are formed in the main body; and a temperature sensor is mounted in the temperature sensor connecting hole, and a pressure sensor is mounted in the pressure sensor connecting hole, wherein the automotive oil-filter assembly is configured such that, during operation, oil enters the automotive oil-filter assembly through the oil inlet of the main body and is filtered by the filter element prior to reaching the oil inlet of the radiator so that filtered oil flows through the radiator.

2. The automotive oil-filter assembly having the under-mounted radiator and made from aluminum by die casting according to claim 1, wherein an oil drain inlet of the main body is formed in the filter element mounting base, and an oil drain outlet of the main body is formed in the main body and communicates with the oil drain inlet of the main body.

3. The automotive oil-filter assembly having the under-mounted radiator and made from aluminum by die casting according to claim 1, wherein the main body is provided with a first plug opening, a second plug opening and a third plug opening, wherein the first plug opening, the second plug opening and the third plug opening are configured to mount plug screws; and a first plug is mounted in the first plug opening through a first plug seal, a second plug is mounted in the second plug opening through a second plug seal, and a third plug is mounted in the third plug opening through a third plug seal.

4. The automotive oil-filter assembly having the under-mounted radiator and made from aluminum by die casting according to claim 3, wherein a plurality of fixing mounting holes of the radiator are formed at a periphery of the radiator mounting position, and a plurality of fixing mounting holes of the main body are formed at a periphery of the main body.

5. The automotive oil-filter assembly having the under-mounted radiator and made from aluminum by die casting according to claim 3, wherein a radiator seal is arranged at each of the oil inlet of the radiator, the oil outlet of the radiator, the coolant inlet of the radiator, and the coolant outlet of the radiator.

6. The automotive oil-filter assembly having the under-mounted radiator and made from aluminum by die casting according to claim 2, wherein the main body is provided with a first plug opening, a second plug opening and a third plug opening, wherein the first plug opening, the second plug opening and the third plug opening are configured to mount plug screws; and a first plug is mounted in the first plug opening through a first plug seal, a second plug is mounted in the second plug opening through a second plug seal, and a third plug is mounted in the third plug opening through a third plug seal.

* * * * *